No. 689,649. Patented Dec. 24, 1901.
G. A. LOWRY.
APPARATUS FOR MAKING GRASS TWINE.
(Application filed May 24, 1901.)

(No Model.) 4 Sheets—Sheet 1.

Fig. 1.

Witnesses
Wm. M. Rheem
Ira D. Perry

Inventor
George A. Lowry
by Brown & Darby
Atty's

No. 689,649. Patented Dec. 24, 1901.
G. A. LOWRY.
APPARATUS FOR MAKING GRASS TWINE.
(Application filed May 24, 1901.)
(No Model.) 4 Sheets—Sheet 2.

Fig. 2.

Witnesses
Wm. M. Rheem
Ira D. Perry

Inventor
George A. Lowry
by Brown & Darby attys

No. 689,649. Patented Dec. 24, 1901.
G. A. LOWRY.
APPARATUS FOR MAKING GRASS TWINE.
(Application filed May 24, 1901.)
(No Model.) 4 Sheets—Sheet 3.

No. 689,649. Patented Dec. 24, 1901.
G. A. LOWRY.
APPARATUS FOR MAKING GRASS TWINE.
(Application filed May 24, 1901.)
(No Model.) 4 Sheets—Sheet 4.

Witnesses.
Wm. M. Rheem.
Ira D. Perry.

Inventor
George A. Lowry
By Bacon & Darby
Attys

UNITED STATES PATENT OFFICE.

GEORGE A. LOWRY, OF CHICAGO, ILLINOIS.

APPARATUS FOR MAKING GRASS TWINE.

SPECIFICATION forming part of Letters Patent No. 689,649, dated December 24, 1901.

Application filed May 24, 1901. Serial No. 61,705. (No model.)

*To all whom it may concern:*

Be it known that I, GEORGE A. LOWRY, a citizen of the United States, residing at Chicago, in the county of Cook and State of Illinois, have invented a new and useful Apparatus for Making Grass Twine, of which the following is a specification.

This invention relates to apparatus for making grass twine, and is designed as an improvement upon the construction disclosed in my prior patent, No. 654,991, dated July 31, 1900.

The object of the invention is to provide means for efficiently feeding or presenting the material, such as stems or stalks of grass and the like, to the action of the traveling nippers by which such stems or stalks are selected and delivered in proper condition to be formed into twine.

A further object of the invention is to provide means whereby after the material has been fed past the nippers or selecting mechanism the long stems or stalks which are desirable for working up into twine and which may have been missed by the nippers or selector mechanism are separated from the remaining or waste portion and returned for re-presentation to the action of the nippers.

A further object of the invention is to provide means embodied within the construction of the machine itself for efficiently combing and straightening the stems or stalks preparatory to the presentation thereof to the action of the nippers or selector mechanism.

A further object of the invention is to provide means for efficiently delivering the waste material in proper condition for further operation for working the same up into bottle-covers or other useful commodities.

Other objects of the invention will appear more fully hereinafter.

The invention consists, substantially, in the construction, combination, location, and arrangement of parts, all as will be more fully hereinafter set forth, as shown in the accompanying drawings, and finally pointed out in the appended claims.

Referring to the accompanying drawings and to the various views and reference-signs appearing thereon.

The same part is designated by the same reference-sign wherever it occurs throughout the several views.

In the drawings reference-sign A designates a suitable framework arranged to support the various operating parts of the apparatus. In suitable bearings formed in this framework is journaled a shaft $B'$, upon which is mounted an endless carrier—such, for instance, as a drum B, carrying the radially-projecting nippers $b$, arranged to be opened and closed at the proper points by cams $M M'$ (see Fig. 1) to permit such jaws to grasp a stem or stalk of grass or other suitable material and to release or drop the same into a chute $A^4$ for delivery to suitable twister and winding mechanisms. (Not shown.)

The parts so far described may be of the usual or any well-known construction and arrangement—such, for instance, as is more fully shown, described, and claimed in my patent above mentioned, and in the specific construction and arrangement of the details thereof form no part of my present invention.

Figure 1:
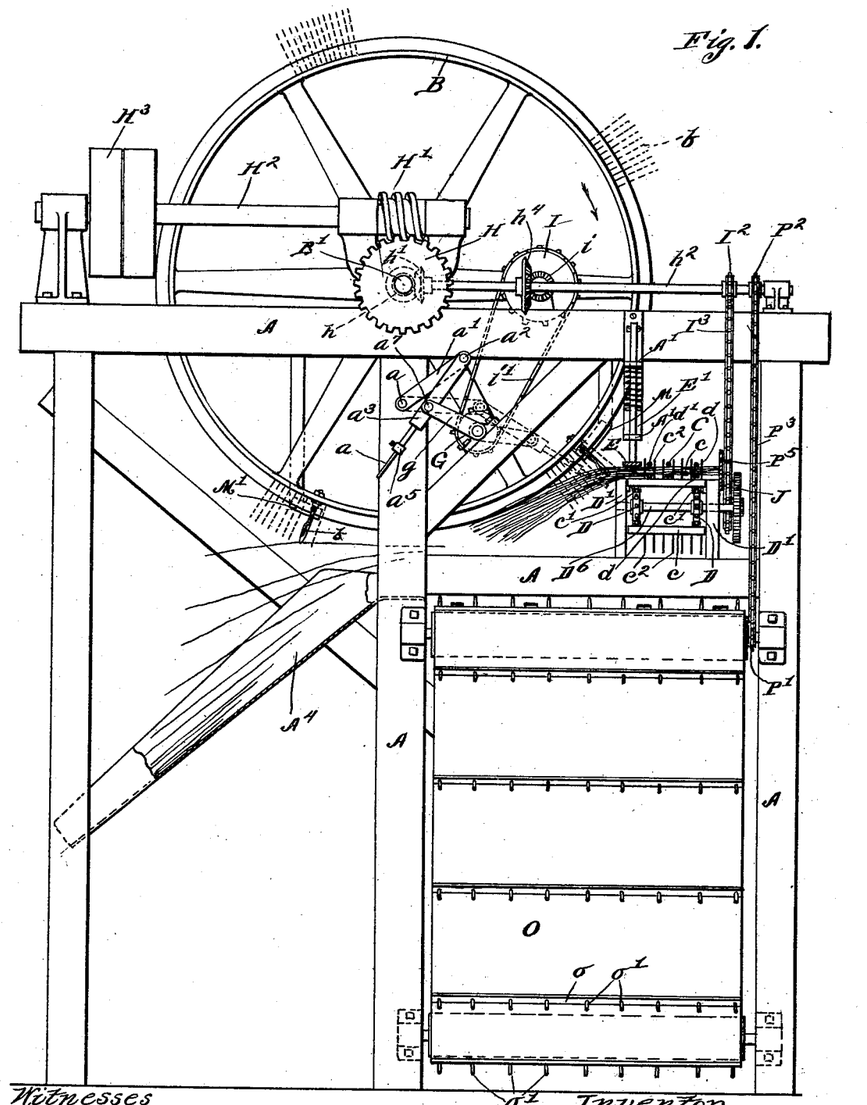
Figure 1 is a view in side elevation of the machine looking in the direction of feed of the material, parts of the feeding mechanism being in transverse section.

In the practical operation of a machine of the character set forth in my patent, and as above indicated, the material, such as stalks or stems or grass or the like, is fed or presented into the path of travel of the nippers B, each of which nippers grasps or clamps one or more of such stems or stalks, preferably at a point about midway of the length thereof, as clearly shown in Fig. 1, and withdraws the same from the mass and deposits it into a delivery-chute $A^4$, from which such material is carried into suitable mechanism for twisting and wrapping the same to form twine. In the manufacture of grass twine it is desirable that only the long stems or stalks of grass be employed, and the stems or stalks selected from the mass presented to the action of the nippers are deposited into the chute $A^4$ in overlapping relation, as clearly shown in Fig. 1, thereby resulting in the production of a continuous strand or twine of uniform thickness. When the grass or other suitable material is harvested, it naturally contains stalks which are long, suitable, and desirable for working up into twine and also stems or stalks which are too short to be worked up into twine, and it has been the usual practice to first comb out this material in the form in which it is harvested, so as to separate the longer stems or stalks from the shorter or undesirable stems or stalks, the latter remaining as refuse or waste. When separate combing-machines are employed for preparing the grass for the twine-making machine, it involves repeated handling of the material, as well as the expense of equipment, maintenance, and operation of the combers and the subsequent delivery of the combed material to the twine-making machine.

It is among the purposes of my present invention to provide means whereby each twine-making machine performs its own combing, so that the material as harvested may be delivered to each machine in bundles or otherwise as it comes from the harvest, and the proper combing is effected at the machine, thus avoiding undue and unnecessarily repeated handling of the material. The material is delivered in bulk upon a platform $P^4$ (see Fig. 3) in convenient position for the operator to place the same upon the carrier mechanism, by which such material is presented to the action of the nippers. I will first describe the construction and arrangement of this carrier mechanism.

Reference-sign C designates an endless apron arranged to travel in a path parallel with shaft $B'$ and also arranged to travel past or in intersecting relation with respect to the path of travel of the nipper-jaws $b$. This feed-apron is composed of a number of slats $c$, which are connected to or carried by sprocket-chains $e'$, operating over sprocket-wheels D. Each of the slats $c$ is provided with a number of spikes or teeth $c^2$. The shafts of sprocket-wheels D are journaled in suitable bearings formed or arranged in side boards $D'$, supported upon or forming part of the main framework A of the machine. A series of slats, wires, or strips $d$ are arranged to extend longitudinally of the endless feed-carriage belt and in the space between the spikes $c^2$ carried thereby and to fit closely down between the top surface of the apron-slats. At their front ends these wires, slats, or strips are fastened or secured to the side boards $D'$ and pass longitudinally or in the direction of travel of the apron to the discharge end of the latter. At their rear ends the wires, slats, or strips $d$ bend upwardly and are fastened or secured to a cross-bar $D^2$. Another set or series of wires, slats, or strips $d'$ are similarly arranged to extend longitudinally of the carrier apron or belt and between the teeth or spikes $c^2$, but which are supported somewhat above the coöperating strips, wires, or slats $d$ to form a passage-way therebetween. At their front ends said wires, slats, or strips $d'$ are bent upwardly and are secured, as at $A'$, to a fixed part of the framework of the machine. The upward bend at the front ends of said wires, slats, or strips $d'$ affords an efficient throat for properly presenting the material to be fed, as will be clearly understood. At their rear ends the wires, slats, or strips $d'$ are bent upwardly into substantially parallel relation with the upwardly-bent rear ends of wires $d$ and are fastened to a cross head or bar $D^3$. This cross head or bar $D^3$ is yieldingly supported with reference to cross-head $D^2$ in any suitable or convenient manner—as, for instance, by means of studs or bolts $D^4$, carried by cross-head $D^2$ and passing up through cross-head $D^3$ and carrying nuts $D^5$ upon their upper ends, and a spring $D^6$ is mounted upon said bolts or studs and interposed between the nuts and the top of the cross-head $D^3$.

The operation of the apparatus so far described is as follows: An operator standing in convenient position with respect to the table $P^4$, upon which the material in bulk is delivered, takes a bunch of the material in his hand and lays it upon the conveyer, with the butt-ends thereof projecting in a direction away from the face of the drum or carrier B and abutting against the plate $P^5$, (see Figs. 1 and 4,) which plate serves the purpose of an abutment or gage, said plate $P^5$ being suitably secured to a side board $D'$ or other convenient part of the framework. The material is then fed in the direction indicated by the arrow in Figs. 3 and 4, and as it advances it is carried into the throat formed by the upturned rear ends of the wires, slats, or strips $d'$, which operate to thrust or force the material down upon and between the pins $c^2$ of the carrier-belt and also into the space between the sets of wires, slats, or strips $d\ d'$. The long and free ends of the stems, stalks, or blades of grass hang down over the carrier and pass along into the path of nippers $d$, carried on the carrier or drum B, and in such position relative to such nippers that each nipper as it passes through the mass of the material is enabled to grasp a blade, stem, or stalk about at a point intermediate the ends thereof, as more clearly shown in Fig. 1, the cam M operating on said nippers to open the jaws thereof during the time said nippers are passing through the mass of material. If desired, and as disclosed in my patent above referred to, the cam M may be adjustable, so as to regulate the point at which the nippers will close and grasp a blade, stem, or stalk of the material. The carrier or drum B, operating in the direction indicated by the arrow in Fig. 1, advances the nippers, with the blade, stem, or stalk of grass clamped therein, until the cam M' operates upon the nippers to open the jaws to permit the stem, stalk, or blade to drop into the chute A⁴, each blade, stem, or stalk being dropped in overlapping relation with respect to the preceding stem, blade, or stalk, as clearly shown.

I will now describe means for combing the mass of material while it is being conveyed and before it reaches the path traversed by the nippers $b$.

Reference-sign $a^3$ designates an arm, upon which is mounted a cross-head $a^5$, carrying tines or fingers $a^4$, constituting a comb. Pivotally mounted on the framework A of the machine, as at $a$, is a link $a'$, to the free end of which, as at $a^2$, the arm $a^3$ is pivoted. Suitably journaled upon the framework A is a sprocket-wheel G, upon the shaft of which is carried a crank-arm $g$, said crank-arm being pivotally connected, as at $a^7$, to the arm $a^3$. By imparting rotation to the shaft of sprocket-wheel G the crank-arm $g$ is revolved, thereby causing the comb-teeth $a^4$ to describe an orbital movement and to be projected into the mass of material, as indicated by the dotted lines in Fig. 1, thereby effecting a combing and straightening of the stems or stalks of grass. The comb is arranged to operate in a path or plane parallel with the plane of operation of the carrier or drum B, but in advance of said drum or carrier, as most clearly shown in Fig. 3. In this manner the material is efficiently combed and straightened before it reaches the path of the nippers $b$.

In the continuous operation of the apparatus the successive withdrawals or extractions of stems, stalks, or blades of the grass from the mass being fed or presented to the nippers gradually thins out the mass, and consequently by the time a given quantity of the material approaches a complete traverse of the path of the nippers it becomes so thinned out as to make the mass supported upon the conveyer-belt comparatively loose, thereby rendering it difficult for the last few nippers of the carrier or drum B to properly perform their work of gripping and withdrawing the stems or stalks. To overcome this difficulty, I arrange a wedge-shaped strip $d^2$ (see Fig. 5) at the edge of the side board D', with the thickened portion thereof presented toward the far side or face of the carrier or drum B with reference to the direction of travel of the conveyer-belt, the arrow in Fig. 5 indicating the direction of feed of the material. Coöperating with this beveled or wedge strip $d^2$ is a presser-foot E, which serves to hold the material down into place and to exert some tension thereon. This presser-foot is yieldingly mounted and is provided with standards or bolts E', which pass up through lugs or projections A², suitably formed on or forming a part of the framework. Springs $e$ are interposed between the upper lugs or extensions A² and pins $e'$, carried by said bolts E', the tension of said springs operating to press the presser-foot downwardly to perform its work of efficiently clamping or holding the material while it is being subjected to the action of nippers $b$. From this construction it will be seen that not only is the material efficiently clamped and held while being acted upon by the nippers $b$, but also the thinning out of the material as the operation thereof progresses is compensated for by means of the inclined or beveled strip $d^2$, thus insuring a proper clamping and holding of the material throughout the entire traverse of the path of the carrier or drum B.

After the material has passed the path of the face of carrier or drum B there may still remain a considerable quantity of stems or stalks of grass of sufficient length to be suitable for working up into twine and which has not been extracted or withdrawn by the nippers. Ordinarily this material would be carried along with the refuse or waste and the utilization thereof for working up into twine lost or wasted. The loss or waste of suitable and desirable material from this source quickly aggregates undesirable proportions. My invention therefore includes means for extracting or separating these longer stems or stalks from the waste or refuse and for returning the same back to the operator for presenting the same again to the nippers, and I will now describe means for accomplishing this purpose.

Figure 2:
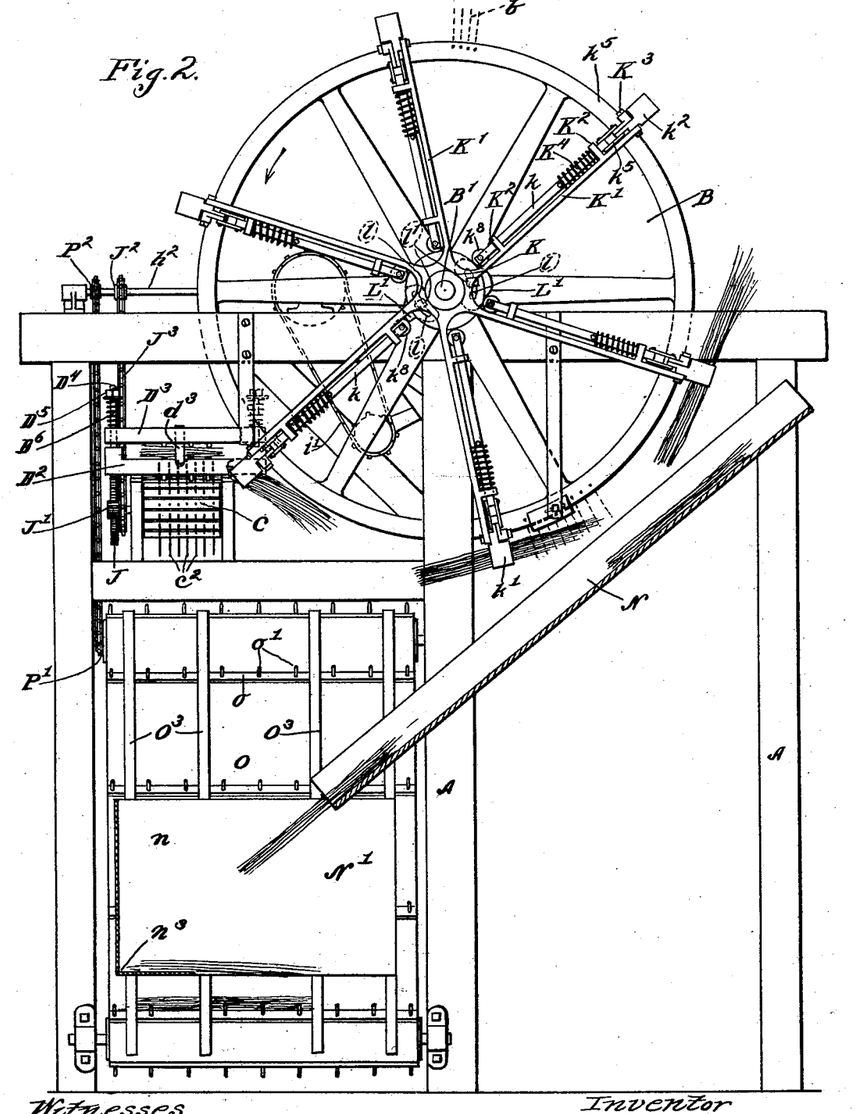
Fig. 2 is a similar view taken from the opposite side of the macine.

Reference-sign K' designate a series of arms carried radially upon a hub K, said hub being mounted upon the far end of shaft D' with reference to the travel of the apron or conveyer C. The arm K' is provided with a lug K², through which operates bolt $k$. Upon the outer free ends of each arm K' are pivoted, as at K³, gripper-jaws $k'$ $k^2$, said jaws having tails or projections $k^3$ $k^4$. One of said jaws, as $k^2$, is provided with an extension $k^9$, arranged to project angularly therefrom across the other of said jaws to prevent the material from becoming entangled with the hinge or pivotal connection of said jaws. At the outer ends of these projections or extensions is pivoted one end of links $k^5$, the other ends of said links being pivotally connected, as at $k^6$, to the outer end of a bolt $k$. A spring K⁴ is mounted on each bolt $k$ and interposed between lug K² and a pin $k^7$, carried by rod $k$, the tension of said spring being constantly exerted in a direction to draw the extensions $k^3$ $k^4$ together or toward each other, thereby maintaining the jaws $k'$ $k^2$ closed. Each rod or bolt $k$ carries a roll or projection $k^8$ at its inner end. Arranged in the path of travel of rolls $k^8$ are lugs L', having cam faces or surfaces. If desired, the cam-lugs L' may be adjustable, and to this end said lugs may be adjusted by means of the bolts $l'$, arranged to pass through elongated slots $l$ in a disk L, suitably mounted in concentric relation with respect to the axis of hub K. By this construction it will be seen that the jaws $k'$ $k^2$ may be opened and closed by the coöperative action of the cam-surfaces L' and springs $K^4$, and the proper timing of the opening and closing of said jaws may be adjusted by a suitable adjustment of the cams L', one of the cams L' being arranged to open and close said jaws while they are passing through the mass of material being conveyed and the other of said cams operating to open said jaws to permit the discharge of the bunch of material grasped therebetween after the hub K has been rotated a sufficient distance, as indicated by the arrow in Fig. 2, and so as to deposit the bunch of material upon a chute N.

Figures 3, 8:
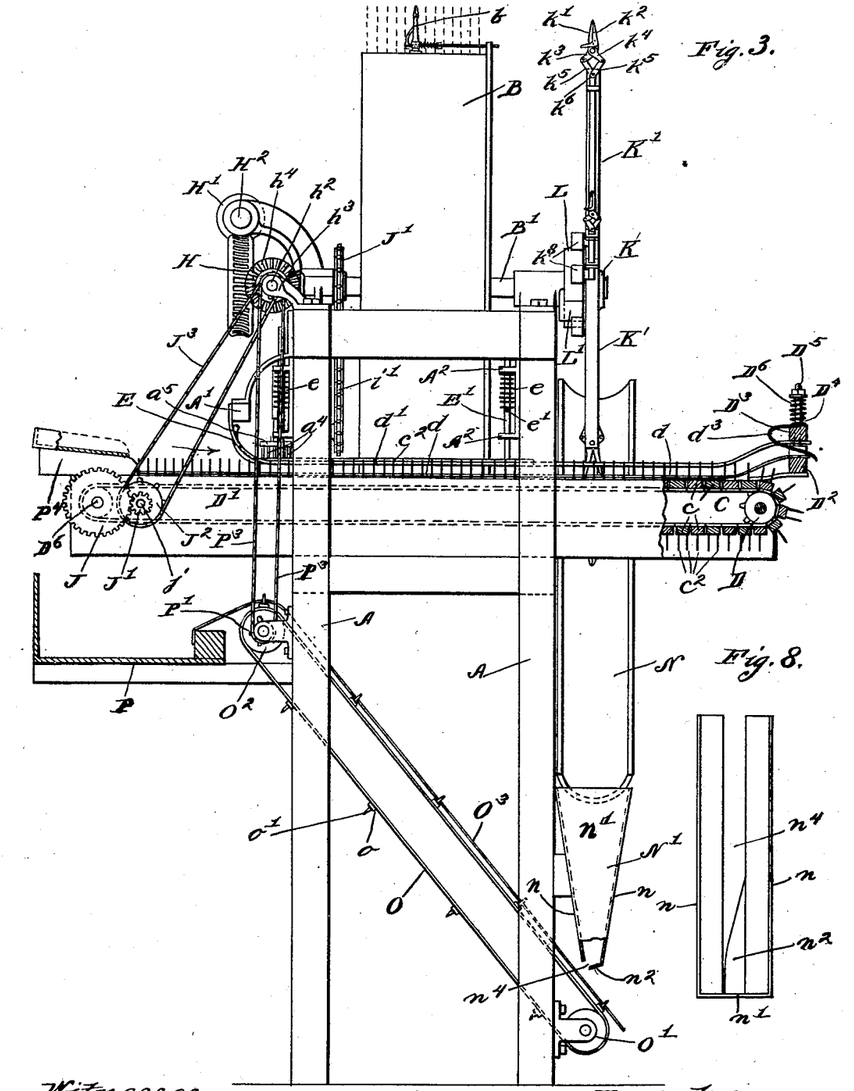
Fig. 3 is a rear end elevation.
Fig. 8 is a detail view, in top plan, of the receiving and delivery box.
Figures 4, 5:
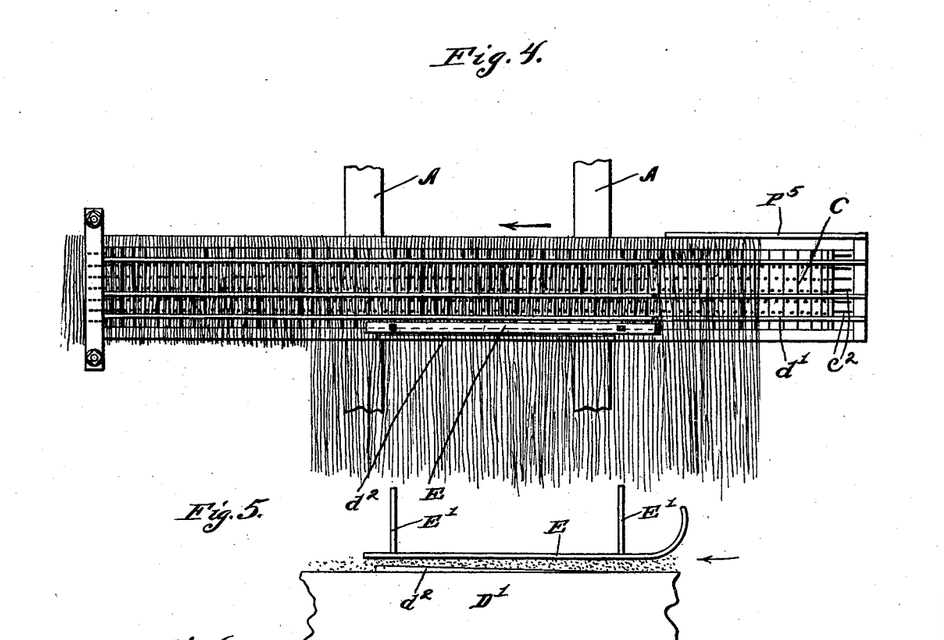
Fig. 4 is a detail view in plan of the feed carrier or apron.
Fig. 5 is a broken detail view, in front elevation, of the same.
Figure 6:
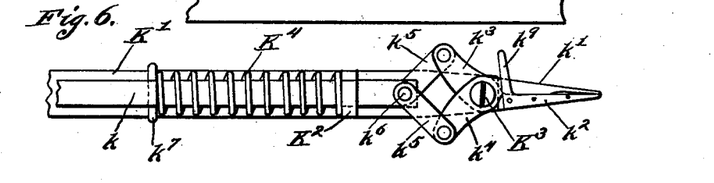
Fig. 6 is a detached detail broken view of one of the gripper-jaws employed for removing or separating the remaining long stems or stalks from the feed carrier or apron and from the mass of waste material after the material has passed the path of the nippers or selector mechanism.
Figure 7:
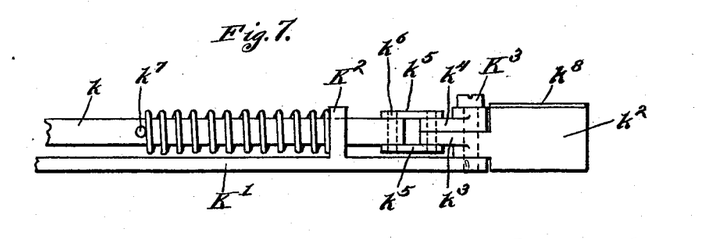
Fig. 7 is a side view of the construction shown in Fig. 6.

In the manner above described the long stems or stalks which may be missed by the nippers $b$ during the passage of the material across the path traversed by said nippers or which may remain with the shorter and undesirable stems or stalks and which might otherwise be carried off to waste with such refuse are extracted from the waste selectively and from the chute N, upon which such selected and withdrawn material is deposited from the clamping-jaws $k'$ $k^2$, and may be returned to the operator, to be again sent through the machine. The return of this material may be effected in many specifically different ways. I have shown a simple arrangement wherein the chute N delivers into a box or casing N', said box or casing comprising an end wall $n'$ and side walls $n$, (see Figs. 3 and 8,) which converge toward each other to form a hopper and having an opening $n^4$ in the bottom thereof. An inclined deflector-plate $n^2$ projects transversely of and partially across the opening $n^4$, as clearly shown, said deflector-plate serving to draw the bunches of material delivered into the hopper down upon a conveyer O. By reference to Fig. 2 it will be seen that the bunches of material are delivered with the butt-ends uppermost from chute N into the hopper N', each bunch striking at about the lower corner of the hopper, as indicated at $n^3$, thence falling down and dropping through the opening $n^4$ upon the conveyer O. The conveyer O comprises slats $o$, having pins $o'$ and strips $O^3$, extending longitudinally of the carrier O, form supports for the bunches of material delivered thereon, said bunches sliding along the upper surfaces of such strips being propelled by the pins $o'$. The carrier O is arranged upon an incline, as shown in Fig. 3, and at their upper ends the strips $O^3$ are bent over and deliver upon a platform P, at this point serving as strippers for the pins $o'$. The platform P is arranged in convenient position for the operator to remove the accumulated long stems or stalks and replace the same upon the carrier C, to be again presented to the action of the machine.

The upturned rear ends of strips $d$ $d'$ serve the purpose of strippers for the pins $c^2$, and also serve the purpose of delivering the waste material from the machine in a condition suitable and proper for being worked up into bottle-covers or other useful commodities without necessitating any further handling of the machine. In order to retard a too-free delivery of the material, a flat spring $D^3$ may be arranged to extend across the space between the delivery upturned and bent rear ends of the strips $d$ $d'$. It is obvious that any suitable sizing or trimming apparatus may be associated with the delivery end of the conveyer C to properly trim down the waste stuff or material delivered therefrom to proper length to form bottle-covers, packing-mats, or the like.

The various operative parts of the apparatus may receive motion in any suitable manner or by any convenient arrangement of driving-gearing. I have shown a simple construction and arrangement of operating gearing which I have found efficient for the purpose, but to which, however, I do not desire to be limited or restricted. In the particular form shown I journal a main drive-shaft $H^2$ in suitable bearings upon the main framework and mount thereon drive-pulleys $H^3$. Upon the end of shaft B', I mount a worm-gear H, arranged to intermesh with and to be driven by a worm H' on shaft $H^2$, thus imparting the desired rotation to shaft B' and the carrier or drum B.

$h^2$ is a counter-shaft suitably journaled upon the main frame and driven from shaft B' through intermeshing gears $h'$ $h$, respectively mounted upon said shafts $h^2$ and B'. Upon shaft $h^2$ are mounted sprocket-wheels $I^2$ and $P^2$. The carrier O is arranged to operate over sprocket-wheel O' $O^2$. Upon the shaft of sprocket-wheel $O^2$ is mounted a sprocket-gear P', and a belt $P^3$, operating over sprockets $P^2$ P', serves to actuate the carrier O. The conveyer-belt C, as above explained, operates over sprocket-wheels D. Upon the shaft $D^6$ of one of said sprocket-wheels is mounted a gear J, arranged to mesh with and to be driven by a pinion J', carried by a shaft $j$, upon which is mounted a sprocket-gear $J^2$, a sprocket-chain $I^3$, operating, respectively, over sprockets $I^2$ on shaft $h^2$ and sprocket $J^2$ on shaft $j$, affording means for actuating the conveyer-belt C. Rotation may be imparted to the shaft which actuates the comb $a^4$ by means of a sprocket-chain $i$, operating over sprocket-wheel G, and a sprocket-wheel I', carried by a short stud or shaft suitably journaled in a bearing upon the main frame and arranged to be driven from shaft $h^2$ through the intermeshing gears $i$ $h^4$. Of course it will be understood that any other suitable or convenient operating-gearing would readily suggest itself to persons skilled in the art and would be equally well adapted for effecting the operation of the various working parts of the machine.

Many variations and changes in the details of construction and arrangement would readily suggest themselves to persons skilled in the art and still fall within the spirit and scope of my invention. I do not desire, therefore, to be limited or restricted to the exact details shown and described; but, Having now set forth the object and nature of my invention and a construction embodying the principles thereof and having described such construction, its purpose, function, and mode of operation, what I claim as new and useful and of my own invention, and desire to secure by Letters Patent, is—

1. In a machine for making grass twine, the combination with a carrier or drum having nippers arranged to grip and grasp the stems or stalks of grass or other suitable material and deposit the same, of a conveyer-belt operating transversely to and past the line of movement of said nippers to positively present the material into position to be grasped and selected by said nippers, as and for the purpose set forth.

2. In a grass-twine-making machine, a drum or carrier having radially-arranged nippers, and means for actuating said carrier and nippers, in combination with a conveyer operating transversely to the line of movement of said nippers, said conveyer-belt having pins or projections arranged to engage the material and positively present and feed the same into position to be grasped or gripped by said nippers, as and for the purpose set forth.

3. In a machine for making grass twine, a carrier or drum having projecting nippers, and means for actuating said carrier or drum and nippers, in combination with a conveyer for presenting the material to the action of said nippers, said conveyer operating transversely of and past the path of said nippers, and a presser-foot arranged over said conveyer and adjacent to the point of action of said nippers, whereby the material is sufficiently condensed and held during the operation of the nippers, as and for the purpose set forth.

4. In a grass-twine machine, a carrier or drum having nippers, and means for actuating said carrier or drum and nippers, in combination with a conveyer arranged to operate transversely of and past the path traversed by said nippers, and means for compensating for the thinning out of the material by the operation of said nippers, as and for the purpose set forth.

5. In an apparatus of the class described, a carrier having nippers, in combination with a conveyer arranged to present the material into position to be gripped by said nippers, and means for compensating for the thinning out of the material as the operation of the nippers proceeds, as and for the purpose set forth.

6. In an apparatus of the class described, a carrier having nippers, and means for actuating the same, in combination with a conveyer arranged to operate in a path transversely of and past the path traversed by said nippers, and an inclined strip over which the material is fed while passing or traversing the path of said nippers, as and for the purpose set forth.

7. In an apparatus of the class described, a carrier having nippers, and means for actuating the same, in combination with a conveyer operating past the path traversed by said nippers, and a rearwardly inclined or beveled strip over which the material is fed while traversing the path of said nippers, as and for the purpose set forth.

8. In an apparatus of the class described, a carrier having nippers, and means for operating the same, in combination with a conveyer operating across and past the path traversed by said nippers, and a yieldingly-mounted presser-foot arranged adjacent to the path of action of said nippers and operating to firmly press and hold the material during the operation of said nippers, as and for the purpose set forth.

9. In an apparatus of the class described, a carrier having nippers, and means for operating the same, in combination with a conveyer operating transversely of and past the path traversed by said nippers, a rearwardly inclined or beveled strip, and a coöperating presser-foot arranged adjacent to the path traversed by the nippers, the material passing over said strip and underneath said presser-foot, as and for the purpose set forth.

10. In an apparatus of the class described, a carrier having nippers, and means for actuating the same, in combination with a conveyer comprising an endless belt having pins or teeth arranged to engage the material to positively feed the same, and wires, strips or slats arranged to extend longitudinally of said conveyer and above the same, said wires, strips or slats forming a passage-way to receive the material while being fed, as and for the purpose set forth.

11. In an apparatus of the class described, a carrier having nippers, and means for actuating the same, in combination with a conveyer comprising an endless belt arranged to operate transversely across and past the path of said nippers, said belt provided with pins or spikes, a wire, slat or strip arranged to extend longitudinally of the conveyer and in proximity to the upper surface thereof, a coöperating strip, wire or slat arranged above the first-mentioned wire, strip or slat, and also extending longitudinally of the conveyer to form a passage for the material and to crowd or press the same down upon said pins or spikes, as and for the purpose set forth.

12. In an apparatus of the class described, a carrier having nippers, and means for actuating the same, in combination with a conveyer arranged to operate across and past the path traversed by said nippers, and strips, wires or slats arranged to extend longitudinally of the conveyer to form a passage for the material, said strips, wires or slats, having their rear ends upturned to form strippers for said conveyer, as and for the purpose set forth.

13. In an apparatus of the class described, a carrier having nippers, and means for actuating the same, in combination with a conveyer-belt operating past the path traversed by said nippers, cross-bars arranged at the delivery end of said belt, wires, strips or slats arranged to extend longitudinally of said conveyer and having their rear ends upturned and connected to said cross-bars, as and for the purpose set forth.

14. In an apparatus of the class described, a carrier having nippers, and means for actuating the same, in combination with a belt operating past the path traversed by said nippers, cross-bars yieldingly mounted with reference to each other and arranged at the rear or delivery end of said conveyer, strips, wires or slats arranged to extend longitudinally of the conveyer to form a passage through which the material is fed, said wires, strips or slats having their rear ends upturned and respectively secured to said cross-bars, as and for the purpose set forth.

15. In an apparatus of the class described, a carrier having nippers, and means for actuating the same, in combination with a conveyer-belt operating past the path traversed by said nippers, longitudinally-arranged strips, wires or slats mounted above but in proximity to the surface of said conveyer, cross-bars to which the rear ends of said strips, wires or slats are connected, and means for retarding the discharge of the material between said cross-heads, as and for the purpose set forth.

16. In an apparatus of the class described, a carrier having nippers, a conveyer operating past the path traversed by said nippers, and a comb arranged in advance of said carrier and operating to comb or straighten the stems or stalks of material before it is presented into the path of said nippers, as and for the purpose set forth.

17. In an apparatus of the class described, a carrier having nippers, and means for actuating the same, in combination with means for presenting the material into position to be grasped by said nippers, and a comb arranged in advance of the path of said nippers, and means for operating said comb, as and for the purpose set forth.

18. In an apparatus of the class described, a carrier having nippers, and means for actuating the same, means for presenting the material into position to be grasped by said nippers, in combination with a combing device comprising an arm carrying combing-teeth, and means for actuating said arm to effect a combing of the material, as and for the purpose set forth.

19. In an apparatus of the class described, a carrier having nippers, a conveyer, and means for actuating said parts, in combination with a comber arranged to operate in a plane transverse to the line of feed of said conveyer and in advance of the plane of operation of said nippers, as and for the purpose set forth.

20. In an apparatus of the class described, a carrier having nippers, and a conveyer, and means for actuating these parts, in combination with a combing device comprising a link pivotally mounted at one end upon the frame of the machine, an arm pivotally connected to said link, a crank connected to said arm, and means for actuating said crank, as and for the purpose set forth.

21. In an apparatus of the class described, a carrier having nippers, means for presenting the material thereto, in combination with means for grasping and withdrawing from said presenting means desired portions of the waste material after passing said nippers, as and for the purpose set forth.

22. In an apparatus of the class described, a carrier having nippers, means for presenting the material thereto, and devices for actuating these parts, in combination with grippers arranged to the rear of said carrier and operating to grip or grasp the long stems or stalks missed by said nippers, as and for the purpose set forth.

23. In an apparatus of the class described, a carrier having nippers, a conveyer operating past the path traversed by said nippers, and means for actuating these parts, in combination with devices arranged to the rear of said carrier and operating to grasp selected portions of the waste material and withdraw the same from said carrier, as and for the purpose set forth.

24. In an apparatus of the class described, and in combination with selector mechanism and feeding devices therefor, of grippers arranged to the rear of said selector mechanism and operating to grip the desirable portions of the waste material and extract the same from said conveyer, as and for the purpose set forth.

25. In an apparatus of the class described, a carrier, a supporting-shaft therefor, nippers mounted on said carrier, a conveyer operating transversely past or across the path traversed by said nippers, grippers mounted upon said shaft to the rear of said carrier and operating in a plane parallel therewith, and means for actuating said grippers to grasp desired portions of the material being conveyed and withdraw the same from said conveyer, as and for the purpose set forth.

26. In an apparatus of the class described, a carrier, nippers carried thereby, and a conveyer operating past the path traversed by said nippers, in combination with grippers arranged to the rear of said carrier, means for operating the same to grasp and extract desired portions of the waste material from the mass of refuse or waste material, and means for returning the extracted portions into position to be again presented to the action of said nippers, as and for the purpose set forth.

27. In an apparatus of the class described, and in combination with a carrier having nippers and a conveyer, of grippers comprising radial arms, rods mounted thereon and having engaging lugs or projections, cams over which said engaging lugs or projections operate to project said rods longitudinally, said grippers connected to said rods and arranged to be opened and closed by the longitudinal displacement of said rods, as and for the purpose set forth.

28. In an apparatus of the class described, a carrier having nippers, a conveyer operating across the path traversed by said nippers, in combination with means for extracting from the mass of material carried by said conveyer desired portions of the waste, a chute upon which said extracted portions are delivered, and a conveyer arranged at the receiving end of said chute to receive said extracted material from said chute and operating to return the same, as and for the purpose set forth.

29. In an apparatus of the class described, a carrier having nippers, a conveyer operating past the path traversed by said nippers, in combination with means arranged to the rear of said carrier and operating to withdraw desired portions of the waste material from said conveyer, a chute to which said withdrawing means delivers, and a hopper arranged at the delivery end of said chute, a conveyer arranged adjacent to the delivery end of said hopper, said hopper provided with a deflector-plate arranged to draw the material into proper position upon said conveyer, as and for the purpose set forth.

30. In an apparatus of the class described, gripper-jaws pivotally connected together, and means for actuating said jaws, one of said jaws provided with an extension arranged to project laterally therefrom to prevent the material from becoming entangled in the hinge or pivot of said jaws, as and for the purpose set forth.

31. In an apparatus of the class described, a main shaft, a carrier mounted thereon, and provided with nippers, a hub also mounted on said shaft to revolve therewith, said hub being arranged at the rear of said carrier, arms carried by said hub, rods mounted on said arms, a cam-plate rigidly mounted in concentric relation with respect to said shaft, and arranged to engage said rods, and gripper-jaws arranged to be actuated by said rods, as and for the purpose set forth.

32. In an apparatus of the class described, a main shaft, a carrier mounted thereon and having nippers, a hub also mounted on said shaft at the rear of said carrier, arms carried by said hub, rods mounted on said arms, a slotted disk mounted in concentric relation with respect to said shaft, cam-plates adjustably mounted in the slots of said disk and arranged to engage said rods, and gripping-jaws arranged to be actuated by said rods, as and for the purpose set forth.

33. In an organized machine of the class described, a carrier having nippers, a conveyer for presenting the material to the action of said nippers, means for recovering desired portions of the waste material from said conveyer after such material has passed said nippers, a conveyer for returning said withdrawn portions, and actuating means for said several mechanisms comprising a main drive-shaft, gearing driven thereby for actuating said carrier, a counter-shaft driven from said carrier-actuating mechanism, and gearing driven from said counter-shaft for actuating said conveyers, as and for the purpose set forth.

34. In an organized machine of the class described, a main drive-shaft, a carrier-shaft, a carrier having nippers mounted on said shaft, gearing actuated by said main drive-shaft for driving said carrier-shaft, a counter-shaft arranged to be driven by said carrier-shaft, a conveyer for presenting the material to said carrier, gearing actuated by said counter-shaft for driving said conveyer, a combing device, gearing also actuated by said counter-shaft for driving said combing device, means for withdrawing desired portions of the waste material from said conveyer after it has passed said carrier, said withdrawing means mounted on said carrier-shaft, and a return-conveyer for such withdrawn material, and gearing actuated by said counter-shaft for driving said return-conveyer; all combined and arranged as and for the purpose set forth.

In witness whereof I have hereunto set my hand, this 22d day of May, 1901, in the presence of the subscribing witnesses.

GEORGE A. LOWRY.

Witnesses:
E. C. SEMPLE,
S. E. DARBY.